(12) United States Patent
Horiike

(10) Patent No.: US 6,744,905 B1
(45) Date of Patent: Jun. 1, 2004

(54) IMAGE PROCESSING APPARATUS AND METHOD, AND STORAGE MEDIUM STORING PROGRAM CODES REALIZING SUCH METHOD

(75) Inventor: Norikazu Horiike, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/275,112

(22) Filed: Mar. 24, 1999

(30) Foreign Application Priority Data

Mar. 25, 1998 (JP) .......................................... 10-077346

(51) Int. Cl.$^7$ ................................................. G06K 9/00
(52) U.S. Cl. ........................ 382/100; 380/54; 713/168
(58) Field of Search ................................ 382/100, 232; 345/712; 386/94; 358/1.1, 3.28, 500; 713/176, 168; 380/54, 51, 287

(56) References Cited

U.S. PATENT DOCUMENTS

| | | | | |
|---|---|---|---|---|
| 5,521,722 A | * | 5/1996 | Colvill | 358/500 |
| 5,644,682 A | * | 7/1997 | Weinberger | 395/1.1 |
| 5,825,356 A | * | 10/1998 | Habib et al. | 345/338 |
| 5,905,819 A | * | 5/1999 | Daly | 382/284 |
| 5,974,548 A | * | 10/1999 | Adams | 713/200 |
| 6,021,196 A | * | 2/2000 | Sandford | 380/4 |
| 2003/0139840 A1 | * | 7/2003 | Magee et al. | 700/133 |
| 2003/0174863 A1 | * | 9/2003 | Brundage et al. | 382/100 |

* cited by examiner

Primary Examiner—Timothy M. Johnson
Assistant Examiner—Barry Choobin
(74) Attorney, Agent, or Firm—Fitzpatrick, Cella, Harper & Scinto

(57) ABSTRACT

An image processing apparatus has an input unit for inputting a plurality set of drawing data representing one frame image a generating unit for generating first intermediate language data representing a watermark to be added to the one frame image and generating second intermediate language data by analyzing the drawing data input from the input unit and a producing unit for producing final print image data in accordance with the first and second intermediate language data, wherein the first intermediate language data representing the watermark is regenerated in accordance with contents of the second intermediate language data. A watermark added to an image can be reliably prevented from being lost by an image editing process.

27 Claims, 5 Drawing Sheets

IMAGE PROCESSING APPARATUS AND METHOD, AND STORAGE MEDIUM STORING PROGRAM CODES REALIZING SUCH METHOD

BACKGROUND OF THE INVENTION

1. Field of the Invention

The present invention relates to an image processing apparatus and method capable of adding predetermined information to an input image, and to a storage medium storing program codes realizing such a method.

2. Related Background Art

Techniques are known which add additional image (called a "watermark" or an "electronic watermark") such as specific characters or marks to an input image (original image) to be printed.

Data representative of a watermark is stored in a specific storage unit. Each time an application supplies an image to be printed, a watermark is added to this image upon printing.

The data representative of an original image is constituted of respective drawing data corresponding to a plurality of editing processes (such as a paste process of object images). In printing the original image, the final set of print image is formed by sequentially using each drawing data to sequentially superpose one object image upon another.

The following two methods may be used when a watermark is added to an original image to print them out.

With one method, a watermark is superposed upon the original image (of a plurality of object images generated from drawing data) (this method is called front addition). With this method, while it is advantageous that the water mark is printed to be always visible, it is disadvantageous that the original image under the watermark is not easy to be visualized.

With the other method, a watermark is placed under the original image (of a plurality of object images generated from drawing data) (this method is called back addition). With this method, while it is advantageous that the original image is printed to be always visible, it is disadvantageous that the watermark under the original image may partially become not easy to be visualized.

When a watermark is added to an original image in printing, the data of the watermark is also stored in the storage unit, similar to each drawing data of the original image. Data of both the original image and water mark is sequentially read from the storage unit and developed into a bit map of a final print image on one paint memory. This bit map image is output to a print unit to print it out.

Since there are two methods of adding a watermark, an image editing application which performs only a back addition method is associated with the following problem. Consider for example the case wherein an image editing application performs an edit process of painting out the whole page and thereafter produce an image of characters or graphics superposed upon the painted-out page. In such a case, if one print image is produced by sequentially using the drawing data of each edit process, the watermark placed earliest is made to disappear from the image by the later image edit process and the final print image is formed in this state without the watermark.

Even though a watermark is already added to an original image and this image is later edited by a large degree, there is a possibility that the image without the watermark is printed.

SUMMARY OF THE INVENTION

It is an object of the present invention to solve all or each of the above-described problems.

It is another object of the present invention to prevent information added to an image from being destroyed by an image edit process.

It is still another object of the invention to reliably add a watermark to an image developed upon a drawing command.

The invention has been made under the above circumstances and it is an object of the invention to reliably prevent a watermark from being made to disappear by editing an original image already added with a watermark.

In order to solve the above problems, an embodiment of the invention provides an image processing apparatus which comprises: an input unit (corresponding to a data analyzing portion 301 of an embodiment) for inputting a plurality set of drawing data representing one frame image; a generating unit (corresponding to a record production portion 302 of the embodiment) for generating first intermediate language data (corresponding to a record in the embodiment) representing a watermark to be added to the one frame image and generating second intermediate language data (corresponding to a record in the embodiment) by analyzing the drawing data input from the input unit; and a producing unit (corresponding to a record processing portion) for producing final print image data on the basis of the first and second intermediate language data, wherein the generating unit regenerates again (corresponding to Steps 104 and 105 in FIG. 1) the first intermediate language data representing the watermark on the basis of the contents of the second intermediate language data produced by the producing unit.

It is another object of the invention to provide an image processing apparatus and method with a novel function.

The other objects and features of the present invention will become more apparent from the following detailed description of embodiments when read in conjunction with the accompanying drawings.

DETAILED DESCRIPTION OF THE PREFERRED EMBODIMENTS

First Embodiment

Figure 3:
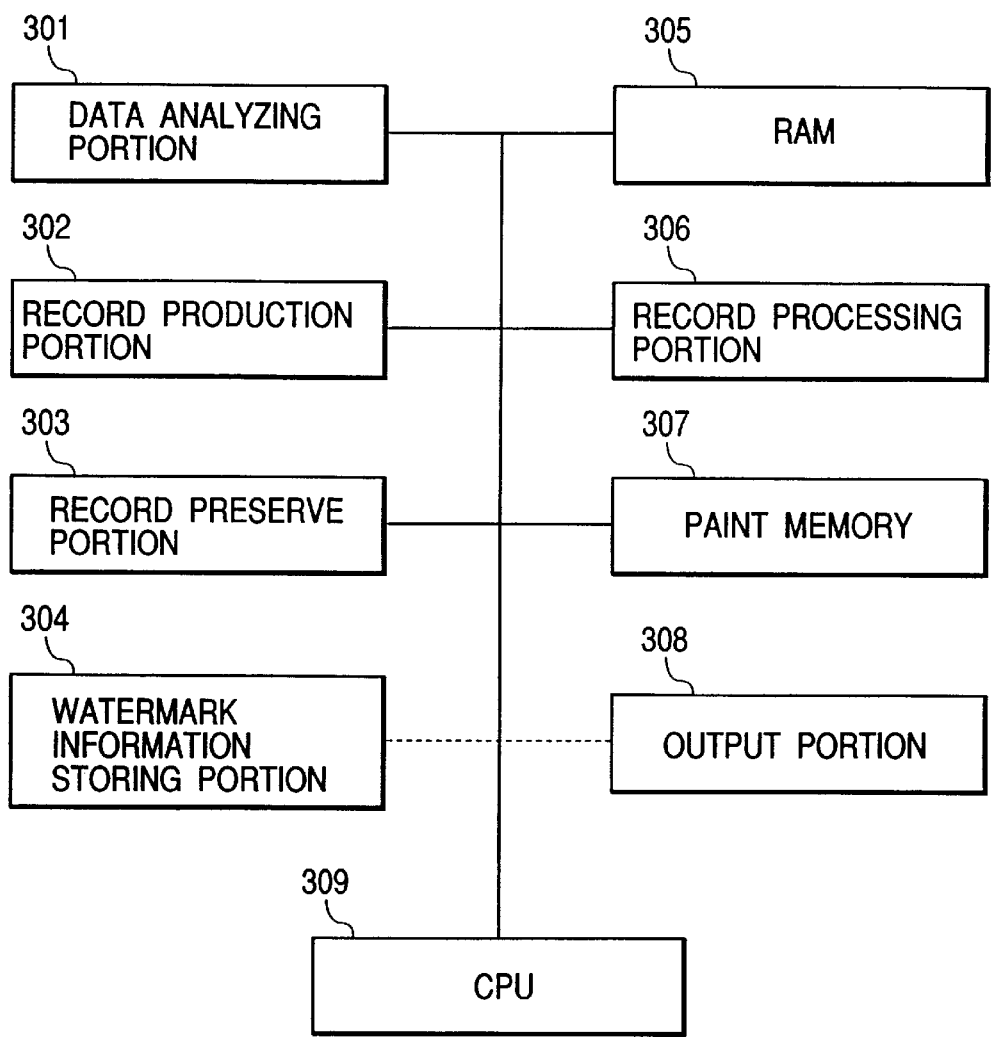
FIG. 3 is a block diagram showing the structure of an image processing apparatus applied to embodiments of the invention.

FIG. 3 is a block diagram showing the structure of an image processing apparatus applied to embodiments of the invention.

It is assumed that an image editing application program runs by using a CPU 309 and a RAM 305 and that image data obtained by and corresponding to each editing process is stored in RAM 305.

Referring to FIG. 3, reference numeral 301 represents a data analyzing portion which receives from RAM 305 various drawing or depiction data obtained from the image editing application during each editing process and analyzes the type of the editing process of respective image data. This analysis results are sequentially sent to a record production portion 302. On the basis of the analysis results of drawing data, the record production portion 302 converts the drawing data into an intermediate language of a data format suitable for a print process. Each of the data obtained by this conversion is called a record. The data analyzing portion 301 and record production portion 302 may be configured as one processing portion.

The record corresponding to each of the drawing data generated by the record production portion 302 is stored in a record preserve portion 303. With the above processes, each of the drawing data generated by the image editing application is converted into a record of the data format usable by an actual print process and each record is loaded in the record preserve portion 303.

Figure 4:
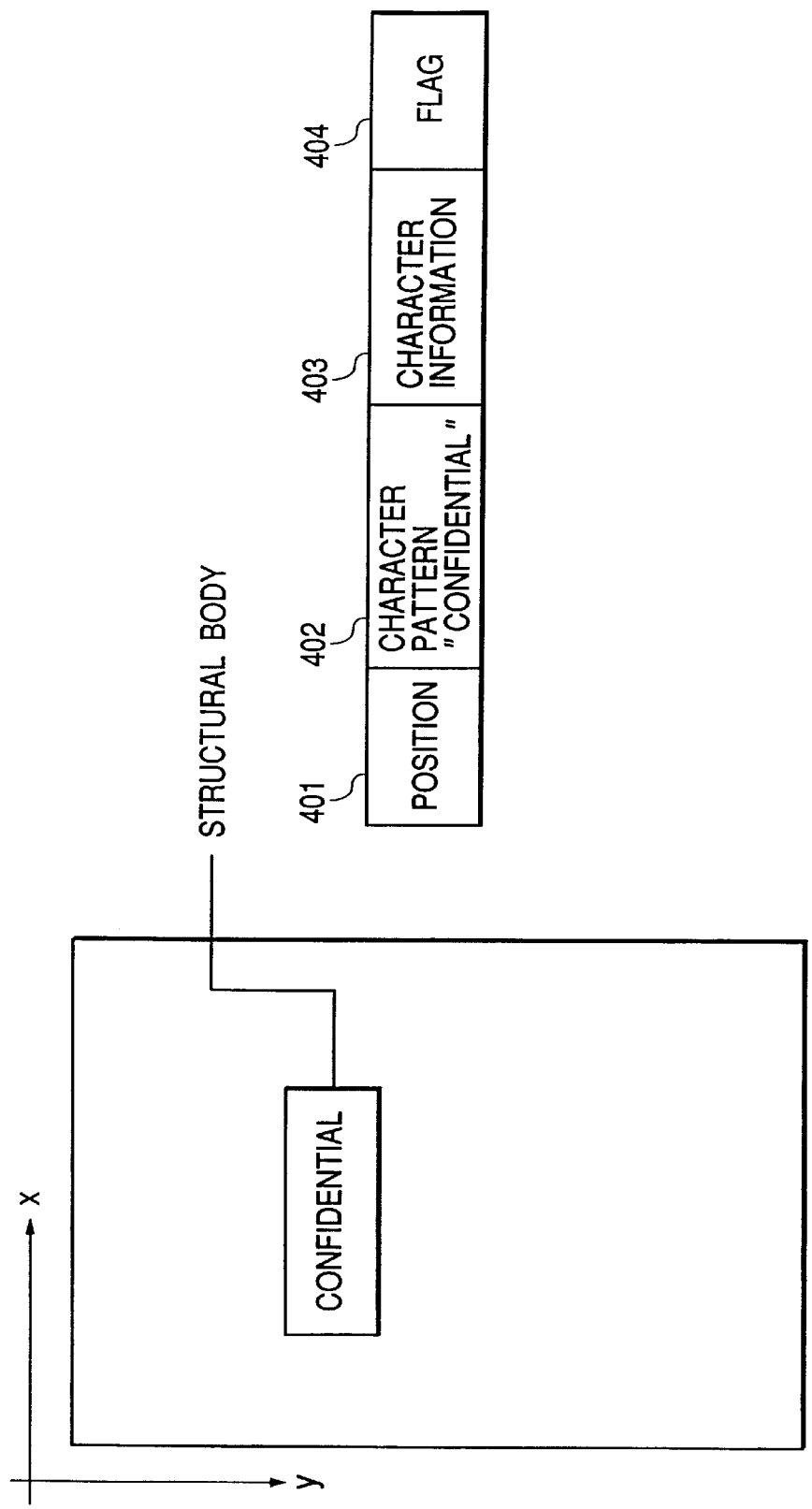
FIG. 4 is a diagram showing the data format of a water mark.

Reference numeral 304 represents a storing portion for storing data representative of a watermark, the storing portion 304 being formed by a ROM or a RAM. As shown in FIG. 4, the data of the watermark includes information that at which position (corresponding to position information 401) in one page what watermark (corresponding to a character pattern (character string) 402 and character information 403) is printed. The data of the watermark stored in the watermark information storing portion 304 is also converted into a record by the record production portion 302 and loaded in the record preserve portion 303.

A record processing portion 306 develops each record stored in the record preserve portion 303 into a bit map of one image and stores it in a paint memory 307. This developed image is transferred via an output portion 308 to an unrepresented printer engine to print it out. RAM 305 temporarily stores the drawing data as well as various other data. CPU (central processing unit) 309 controls all the operations described above, addition of a watermark, and all other operations to be performed in this embodiment.

The embodiment will be described with reference to the flow chart shown in FIG. 1. This flow chart illustrates the control operation to be executed by the image processing apparatus. In this control operation, it is judged whether drawing data supplied from an image editing application is printed by adding or not adding a watermark.

In this embodiment it is assumed that the above-described back addition is used as the method of adding a watermark to an original image (constituted of only drawing data supplied from an image editing application).

In this image processing apparatus, first at Step 101 data representative of a water mark stored in the storing portion 304 shown in FIG. 3 is converted into a record of the watermark written with an intermediate language. This record is produced by the record production portion 302 shown in FIG. 3 and stored in the record preserve portion 303.

With the back addition method used by the embodiment, of the records written with the intermediate language (records of the watermark and each drawing data), the record of the watermark is first developed into a bit map on the paint memory 307, and then the original image (bit map image basing upon the records of respective drawing data) is depicted or drawn in an overwrite manner. It is therefore necessary that the record of the watermark is produced first.

Next, at Step 102 one set of drawing data supplied from the image editing application is read from RAM 305 and analyzed. This analysis is performed by the data analyzing portion 301 shown in FIG. 3. As will be later described, in this embodiment, the drawing data is sequentially converted into records one after another.

In accordance with the data analyzed at Step 103, the record production portion 302 produces a record. The data analysis and record production may be performed at one process step.

At Step 104, it is judged whether the record produced at Step 103, i.e., the record corresponding to the drawing data supplied from the image editing program, is to be subject to an image edit process of "painting out the page". For example, if a record corresponding to some drawing data indicates a process of "painting out white the whole page", the record is judged that it is subject to the process of "painting out the page".

In view of the objects of the invention, this judgement is made not only for the process of "painting out the page" but also for a process which "affects an area of a watermark", e.g., a process of reducing or magnifying the whole page or changing the shape of the page.

As a modification, if a watermark does not occupy the whole page as shown in FIG. 4, instead of judging whether the record is subject to the process of "painting out the page", it may be judged whether the record is subject to a process of "painting out only an area where the watermark exists" or a process of editing an area where the watermark exists". In this manner, a reliable judgement is possible which matches the objects of the invention.

The judgement method will be detailed with reference to FIG. 5.

Figure 5:
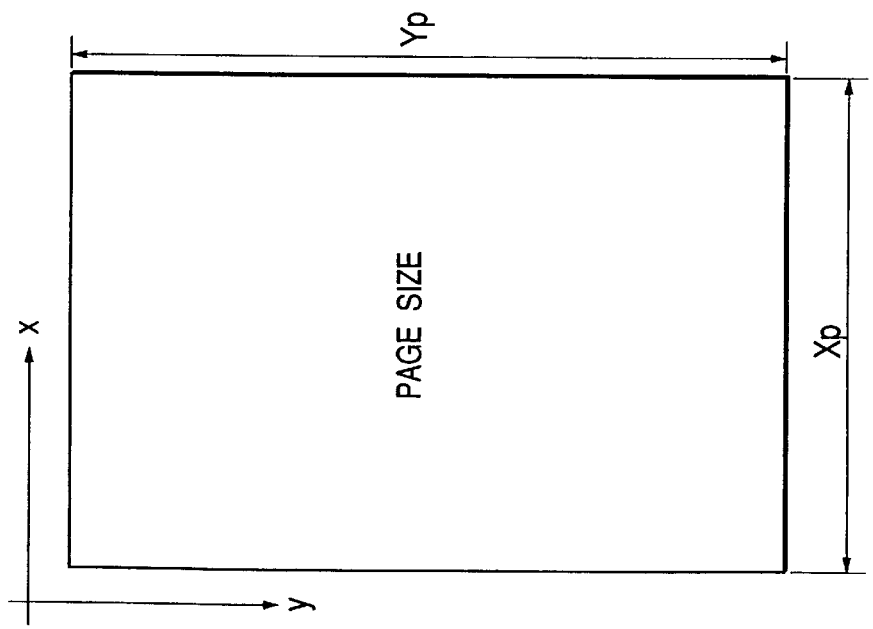
FIG. 5 is a diagram illustrating the state of Step 104 shown in FIG. 1 according to a first embodiment of the invention.

FIG. 5 shows one page having a size of $(X_p, Y_p)$ which information is stored in advance in RAM 305 shown in FIG. 3. If the analysis results of each drawing data supplied from the image editing application indicate a process of "painting out white an area $(X_p, Y_p)$", then this process is judged as the same as the process of "painting out the page".

If it is judged at Step 104 as the process of "painting out the page", the flow advances to Step 105, whereas if not, the flow advances to Step 106.

At Step 105, the record of the watermark is again produced (reproduced). In this manner, the record of the watermark can be added at the back of the record corresponding to the process of "painting out the page". Therefore, when the records are developed at a later process into a bit map, it is possible to reliably prevent the watermark from disappearing. When the watermark is to be reproduced again, the same record production portion 302 shown in FIG. 3 is used.

At Step 106 it is checked whether there is drawing data whose record is still not produced. If there is such drawing data, the flow returns to Step 102 to repeat the above processes until all the drawing data is processed.

As described above, if a record corresponding to the drawing data supplied from the image editing application is to be subject to a process which "makes the watermark disappear", the record of the watermark is newly added to the record of the drawing data to thereby rewrite the watermark. For example, while a plurality set of drawing data constituting one image is supplied from the image editing application, if Step 104 detects four records to be subject to the process of "painting out the page", four records of the watermark are newly produced.

Figure 2:
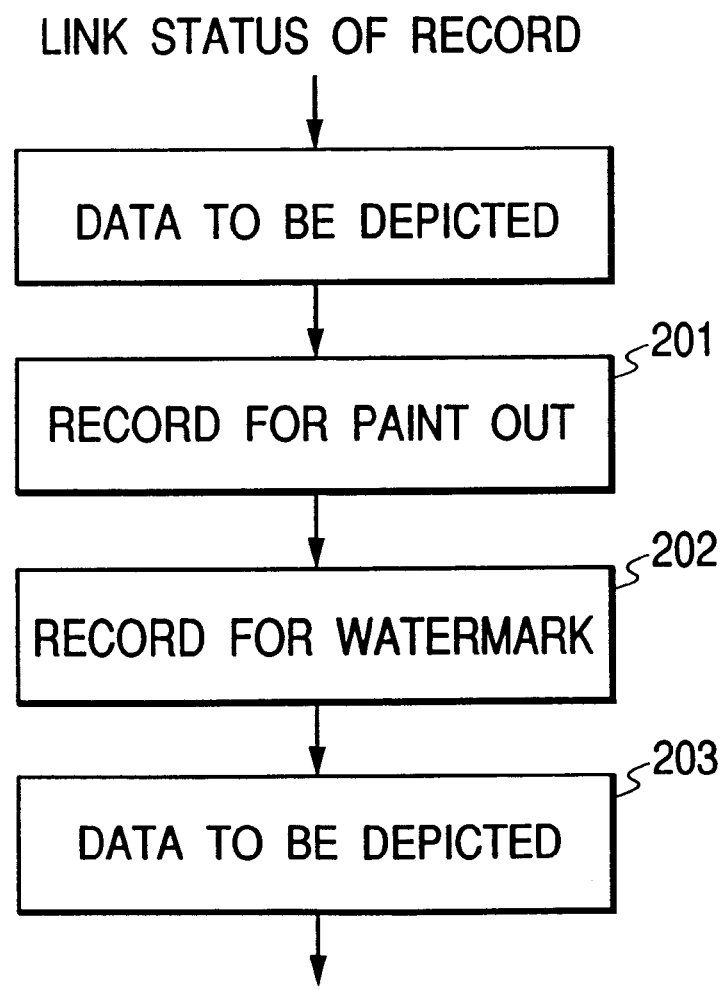
FIG. 2 is a diagram illustrating a link state of records.

An example of the link state of records after the record production process is shown in FIG. 2.

In the embodiment shown in FIG. 2, a record 202 of the watermark is linked by all means to a record 201 to be subject to the process of "painting out the page", and drawing data 203 is linked to the record 202. By sequentially processing links, the watermark can be reliably printed without being lost even if the watermark is added by the back addition method.

Second Embodiment

In the second embodiment, another example of the modification of the first embodiment will be described. The fundamental structure of an image processing system is similar to that of the first embodiment shown in FIG. 1, and so the detailed description thereof is omitted. The characteristic features of the second embodiment will be described hereinunder.

Figure 1:
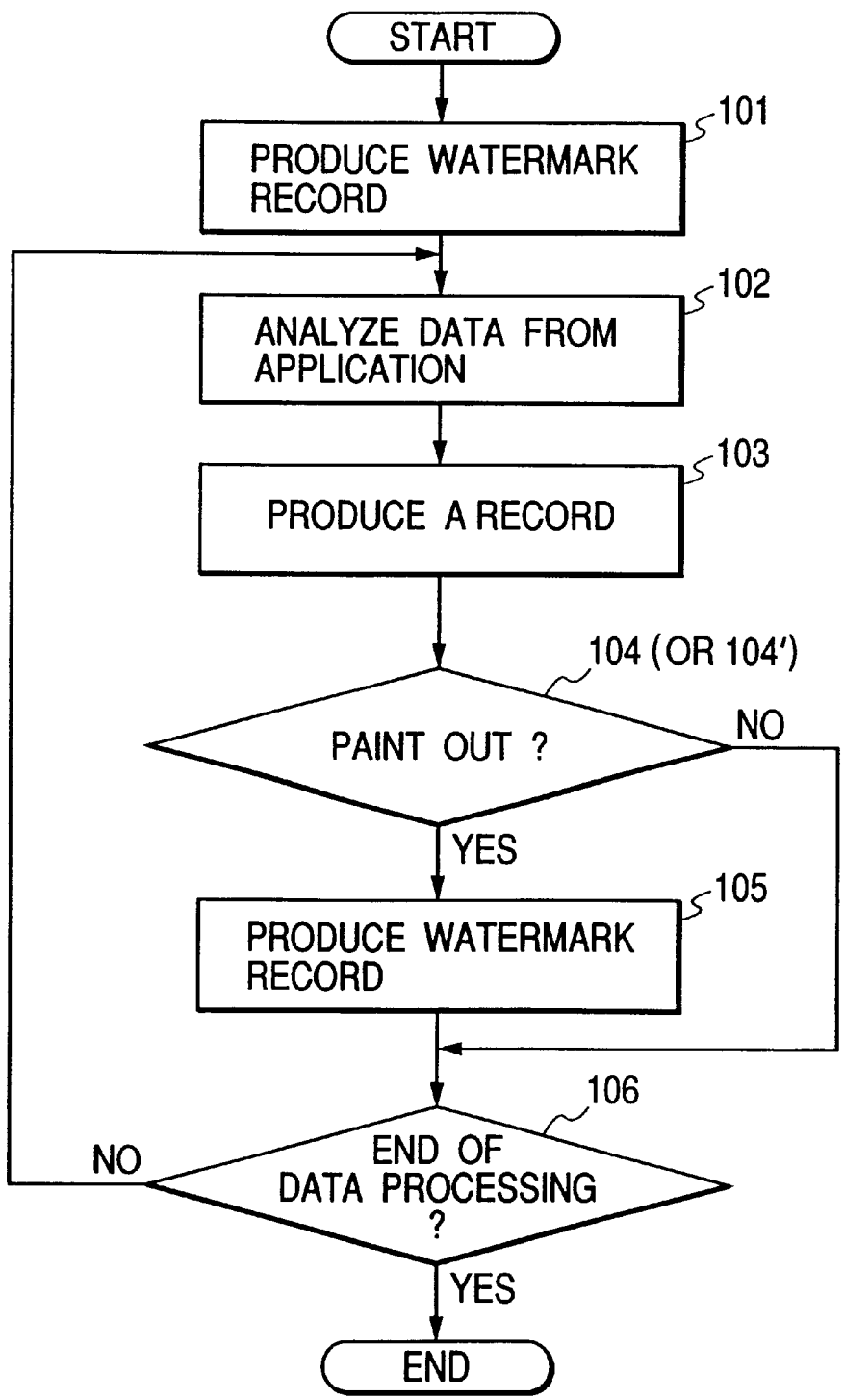
FIG. 1 is a flow chart illustrating the most characteristic features of an embodiment of the invention.

With reference to FIG. 1, the second embodiment will be described, although some description is duplicated.

At Step 101 data representative of a water mark stored in the storing portion 304 shown in FIG. 3 is converted into a record of the watermark written with an intermediate language. This record is produced by the record production portion 302 shown in FIG. 3 and stored in the record preserve portion 303.

With the back addition method used by the embodiment, of the records written with the intermediate language (records of the watermark and each drawing data), the record of the watermark is first developed into a bit map on the paint memory 307, and then the original image (bit map image basing upon the records of respective drawing data) is depicted or drawn in an overwrite manner. It is therefore necessary that the record of the watermark is produced first.

Next, at Step 102 one set of drawing data supplied from the image editing application is read from RAM 305 and analyzed. This analysis is performed by the data analyzing portion 301 shown in FIG. 3. As will be later described, in this embodiment, the drawing data is sequentially converted into records one after another.

In accordance with the data analyzed at Step 103, the record production portion 302 produces a record. The data analysis and record production may be performed at one process step.

Step 104' in the second embodiment differs from Step 104 in the first embodiment. At Step 104', it is judged whether the record produced at Step 103, i.e., the record corresponding to the drawing data supplied from the image editing program, is to be subject to an image edit process of "painting out an area so as to hide the watermark". For example, if a record corresponding to some drawing data indicates a process of "painting out white some area so as to hide the watermark", the record is judged that it is subject to the process of "painting out the page".

The judgement method at Step 104' of the second embodiment will be detailed with reference to FIG. 6.

Figure 6:
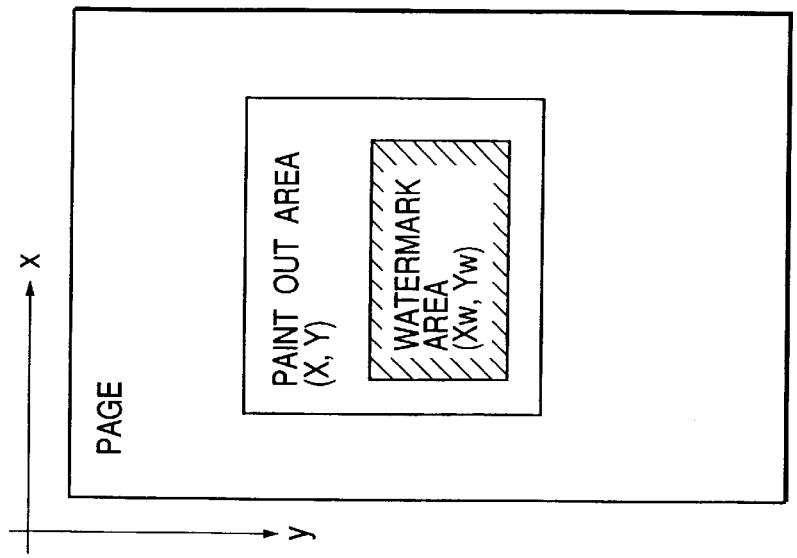
FIG. 6 is a diagram illustrating the state of Step 104' shown in FIG. 1 according to a second embodiment of the invention.

FIG. 6 shows an area of a watermark having a size of ($X_w$, $Y_w$) which information is stored in advance in RAM 305 shown in FIG. 3. The analysis results of drawing data indicate that the record is subject to a process of painting out an area having a size of (X, Y). The size ($X_w$, $Y_w$) is compared with the size (X, Y) and if the analysis results of the drawing data supplied from the image editing application indicate that the record is subject to a process of "painting out white the area ($X_w$, $Y_w$) then it is judged that the record is subject to a process of painting out the watermark.

If it is judged at Step 104' as a process of "painting out the watermark so as to hide it", the flow advances to Step 105, whereas if not, the flow advances to Step 106.

At Step 105, the record of the watermark is reproduced. In this manner, the record of the watermark can be added at the back of the record corresponding to the process of "painting out white the watermark to hide it". Therefore, when the records are developed at a later process into a bit map, it is possible to reliably prevent the watermark from disappearing. When the watermark is to be reproduced, the same record production portion 302 shown in FIG. 3 is used.

At Step 106 it is checked whether there is drawing data whose record is still not produced. If there is such drawing data, the flow returns to Step 102 to repeat the above processes until all the drawing data is processed.

As described above, if a record corresponding to the drawing data supplied from the image editing application is to be subject to a process which "makes the watermark disappear", the record of the watermark is newly added to the record of the drawing data to thereby rewrite the watermark. For example, while a plurality set of drawing data constituting one image is supplied from the image editing application, if Step 104 detects four records to be subject to the process of "painting out the page", four records of the watermark are newly produced.

An example of the link state of records after the record production process is shown in FIG. 2.

In FIG. 2, a record 202 of the watermark is linked by all means to a record 201 to be subject to the process of "painting out the page", and drawing data 203 is linked to the record 202. By sequentially processing links, the watermark can be reliably printed without being lost even if the watermark is added by the back addition method.

(Modification)

In the above embodiments, the watermark is produced at first at Step 101. The invention is not limited thereto, but is applicable also to the case wherein drawing data of a watermark is supplied from the image editing application, together with drawing data of an original image. In this case, the drawing data of the watermark supplied from the image editing application is added by the back addition method.

The present invention may be applied to a system constituted of a plurality of apparatuses or to a system constituted of a single apparatus.

The invention is not limited only to the apparatus and system realizing the functions of the above embodiments, but the scope of the invention also includes a system or apparatus whose computer (CPU or MPU) runs to operate various devices connected thereto in accordance with software program codes supplied to the system or apparatus so as to realize the functions of the above embodiments.

In this case, the software program codes themselves realize the embodiment functions. Therefore, the program codes themselves and means for supplying such program codes to a computer, e.g., a storage medium storing such program codes, are included in the scope of the present invention.

The storage medium storing such program codes may be a floppy disk, a hard disk, an optical disk, a magneto-optical disk, a CD-ROM, a magnetic tape, a nonvolatile memory card, a ROM, and a like.

Such program codes are included in the scope of the invention, not only for the case wherein the embodiment functions are realized by executing the program codes supplied to the computer which controls various devices, but also for the case wherein the embodiment functions are realized by the program codes used with an OS (operating system) on which the computer runs or with other various types of application software.

Furthermore, the scope of the invention also includes the case wherein on the basis of the program codes stored in a memory of a function expansion board or unit connected to the computer supplied with the program codes, a CPU or the like of the function board or unit executes part or the whole of the actual tasks for realizing the embodiment functions.

The watermark of the embodiments includes information of a source of the image represented by a drawing command. Specifically, the source of the image may represent a copyright of the image. The water mark may be a mark hard to be visualized with human eyes, or a mark easy to be visualized with human eyes.

As described so far, according to the embodiments, it is possible to reliably prevent a watermark added to an image from being lost by an image editing process.

What is claimed is:

1. An image processing method comprising the steps of:
    producing a watermark:
    inputting a drawing command;
    analyzing the drawing command;
    discriminating whether or not the drawing command indicates an image edit process of painting out, in accordance with the drawing command; and
    reproducing again the watermark when it is discriminated that the drawing command indicates the image edit process of painting out.

2. An image processing method according to claim 1, wherein said discriminating step includes discriminating an area to be painted out in accordance with the drawing command.

3. An image processing method according to claim 1, wherein said discriminating step includes discriminating as to whether the drawing command is a command of painting out a whole page.

4. An image processing method according to claim 1, further comprising a step of producing an image represented by the drawing command.

5. An image processing method according to claim 1, further comprising a step of printing the image represented by the drawing command, with the watermark added.

6. An image processing method according to claim 1, wherein the watermark includes information of a source of the image represented by the drawing command.

7. An image processing method according to claim 6, wherein the source of the image represents a copyright of the image.

8. An image processing method according to claim 1, wherein the watermark is a mark hard to visualize with human eyes.

9. An image processing method according to claim 4, wherein the watermark is a mark easy to visualize with human eyes.

10. An image processing apparatus comprising:
    means for producing a watermark;
    means for inputting a drawing command;
    means for analyzing the drawing command;
    means for discriminating whether or not the drawing command indicates an image edit process of painting out, in accordance with the drawing command; and
    means for reproducing again the watermark when it is discriminated that the drawing command indicates the image edit process of painting out.

11. A computer readable storage medium storing program codes, the program codes comprising:
    a code for producing a watermark;
    a code for inputting a drawing command;
    a code for analyzing the drawing command;
    a code for discriminating whether or not the drawing command indicates an image edit process of painting out, in accordance with the drawing command; and
    a code for reproducing again the watermark when it is discriminated that the drawing command indicates the image edit process of painting out.

12. An image processing apparatus comprising:
    inputting means for inputting a plurality set of drawing data representing one frame image;
    generating means for generating first intermediate language data representing a watermark to be added to the one frame image and generating second intermediate language data by analyzing the drawing data input from said inputting means; and
    producing means for producing final print image data on the basis of the first and second intermediate language data,
    wherein said generating means regenerates the first intermediate language data representing the watermark, on the basis of contents of the second intermediate language data produced by said producing means.

13. An image processing apparatus according to claim 12, wherein the plurality set of drawing data input by said inputting means is drawing data generated when an image editing application generates the one frame image by editing a predetermined image.

14. An image processing apparatus according to claim 12, wherein the final print image data is image data of a bit map format.

15. An image processing method comprising:
    an input step, of inputting a plurality set of drawing data representing one frame image;
    a generating step, of generating first intermediate language data representing a watermark to be added to the one frame image and generating second intermediate language data by analyzing the drawing data input in said inputting step; and
    a producing step, of producing final print image data on the basis of the first and second intermediate language data,
    wherein said generating step includes regenerating the first intermediate language data representing the watermark, on the basis of contents of the second intermediate language data produced in said producing step.

16. A computer readable storage medium storing an image processing program, the program comprising:
    an input step, of inputting a plurality set of drawing data representing one frame image;
    a generating step, of generating first intermediate language data representing a watermark to be added to the one frame image and generating second intermediate language data by analyzing the drawing data input in said inputting step; and
    a producing step, of producing final print image data on the basis of the first and second intermediate language data,
    wherein said generating step includes regenerating the first intermediate language data representing the watermark, on the basis of contents of the second intermediate language data produced in said producing step.

17. An image processing method comprising the steps of:
    producing a watermark;
    receiving a plurality of drawing commands;

analyzing the drawing commands;

discriminating whether or not the drawing command indicates an image edit process of painting out, in accordance with the drawing command; and reproducing again the watermark when it is discriminated that the drawing command indicates the image edit process of painting out.

18. An image processing method according to claim 17, wherein said discriminating step includes discriminating an area to be painted out in accordance with the drawing command.

19. An image processing method according to claim 17, wherein said discriminating step includes discriminating as to whether the drawing command is a command of painting out a whole page.

20. An image processing method according to claim 17, further comprising a step of producing an image represented by the drawing command.

21. An image processing method according to claim 17, further comprising a step of printing the image represented by the drawing command, with the watermark added.

22. An image processing method according to claim 17, wherein the watermark includes information of a source of the image represented by the drawing command.

23. An image processing method according to claim 22, wherein the source of the image represents a copyright of the image.

24. An image processing method according to claim 17, wherein the watermark is a mark hard to visualize with human eyes.

25. An image processing method according to claim 20, wherein the watermark is a mark easy to visualize with human eyes.

26. A computer readable storage medium storing program codes, the program codes comprising:

a code for producing a watermark;

a code for receiving a plurality of drawing commands;

a code for analyzing the drawing command;

a code for discriminating whether or not the drawing command indicates an image edit process of painting out, in accordance with the drawing command; and a code for reproducing again the watermark when it is discriminated that the drawing command indicates the image edit process of painting out.

27. An image processing apparatus comprising:

means for producing a watermark;

means for receiving a plurality of drawing commands;

means for analyzing the drawing commands;

means for discriminating whether or not the drawing command indicates an image edit process of painting out, in accordance with the drawing command; and means for reproducing again the watermark when it is discriminated that the drawing command indicates the image edit process of painting out.

* * * * *